United States Patent
Liu

(10) Patent No.: US 7,148,873 B2
(45) Date of Patent: Dec. 12, 2006

(54) ENTRANCE INTERCOM SPECIFIC COLOR PANEL MODULE

(76) Inventor: Wen-Hsiung Liu, P.O. Box 82-144, Taipei (TW)

( * ) Notice: Subject to any disclaimer, the term of this patent is extended or adjusted under 35 U.S.C. 154(b) by 523 days.

(21) Appl. No.: 10/759,063

(22) Filed: Jan. 20, 2004

(65) Prior Publication Data

US 2005/0156866 A1    Jul. 21, 2005

(51) Int. Cl.
*G09G 3/36* (2006.01)

(52) U.S. Cl. .......................... 345/102; 345/62; 345/70

(58) Field of Classification Search ................ 345/102; 349/58, 61, 62, 70
See application file for complete search history.

(56) References Cited

U.S. PATENT DOCUMENTS

| | | | | |
|---|---|---|---|---|
| 5,146,354 A | * | 9/1992 | Plesinger | 349/59 |
| 6,175,396 B1 | * | 1/2001 | Kim et al. | 349/58 |
| 6,590,626 B1 | * | 7/2003 | Suzuki et al. | 349/70 |
| 6,894,757 B1 | * | 5/2005 | Ha et al. | 349/149 |
| 2004/0061814 A1 | * | 4/2004 | Kim et al. | 349/65 |

FOREIGN PATENT DOCUMENTS

JP        2005-031124      *  2/2005

* cited by examiner

*Primary Examiner*—Kent Chang
(74) *Attorney, Agent, or Firm*—Leong C. Lei

(57) ABSTRACT

An entrance intercom specific color panel module provides higher lumens and more consistent brightness, lower production cost, upgraded image quality, longer service life, summary manufacturing process, easy assembly and fast replacement of parts, comprised of chip on glass (COG) LCD panel adapted with tape automated bonding (TAB) backlight module in direct light design including a reflector, a fluorescent lamp and a light guide plate; the reflector approximately in W-shape section, rectangular plastic sheet provided with a recess to accommodate the lamp; the light guide plate made of transparent acrylic material being adhered to the surface of the reflector, an arc diffuser being provided on the bottom of the light guide plate at where in relation to the area of the light tube; on the top of the light guide plate being bonded to the back of the LCD panel.

1 Claim, 4 Drawing Sheets

ENTRANCE INTERCOM SPECIFIC COLOR PANEL MODULE

BACKGROUND OF THE INVENTION (a) Technical Field of the Invention

The present invention is related to an entrance color panel module, and more particularly, to one provides c higher lumens and more consistent brightness, lower production cost, upgraded image quality, longer service life, summary manufacturing process, easy assembly and fast replacement of parts.

(b) Description of the Prior Art

As the key device to display image by the entrance intercom, the penal module is comprised of an LCD panel and a backlight module.

Tape Automated Bonding (TAB) and Chip On Glass (COG) are two processes available for the production of the LCD glass of the prior art. Whereas thinner and larger panels dominate the demands in the market, COG technique has been so far used in the production of LCD glass while the TAB process is practically discontinued. A COG panel module of the prior art for the entrance intercom as illustrated in FIG. 1 has its backlight module (B) generally sidelight designed, wherein, a cold cathode fluorescent lamp, CCFL (B1) is provided by the side of a LCD panel (A) adapted with a BEF and a diffuser to provided the light source for image display by the LCD panel (A). The sidelight backlight module (B) though providing the advantages of being compact and low power consumption for the use by the smaller and portable products, is comparatively expensive, lower utility of light, insufficient lumens, difficult to control for consistent brightness, and not convenient in replacing damaged parts.

Furthermore the TAB panel module as illustrated in FIG. 2 has its backlight module (D) generally direct light designed, that is, a fluorescent lamp (D1) is placed right below the LCD panel (C) to provide the light source required by the LCD panel to display images. Comparatively, the direct light designed backlight module (D) for being larger and thicker features higher utility of light, higher lumens, and lower cost; however, power consumption increases with longer fluorescent lamp (D1).

SUMMARY OF THE INVENTION

The primary purpose of the present invention is to provide an entrance intercom specific color panel module that gives higher lumens and more consistent brightness, lower production cost, upgraded image quality, longer service life, summary manufacturing process, easy assembly and fast replacement of parts to eliminate those flaws found with the prior art. To achieve the purpose, the present invention is essentially comprised of a COG type LCD panel adapted with TAB type backlight module.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
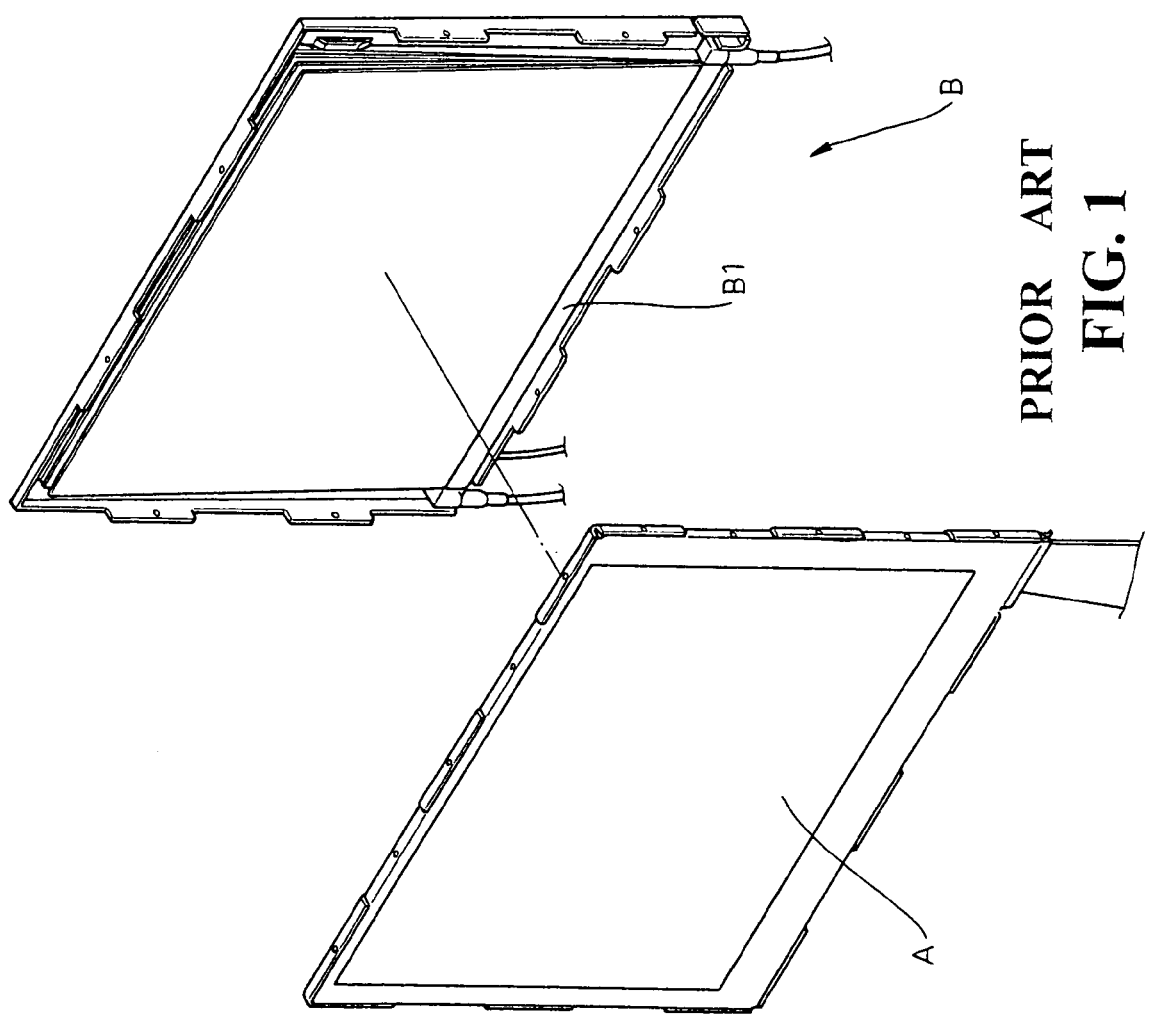
FIG. 1 is an exploded view of a COG type panel module of the prior art.
Figure 2:
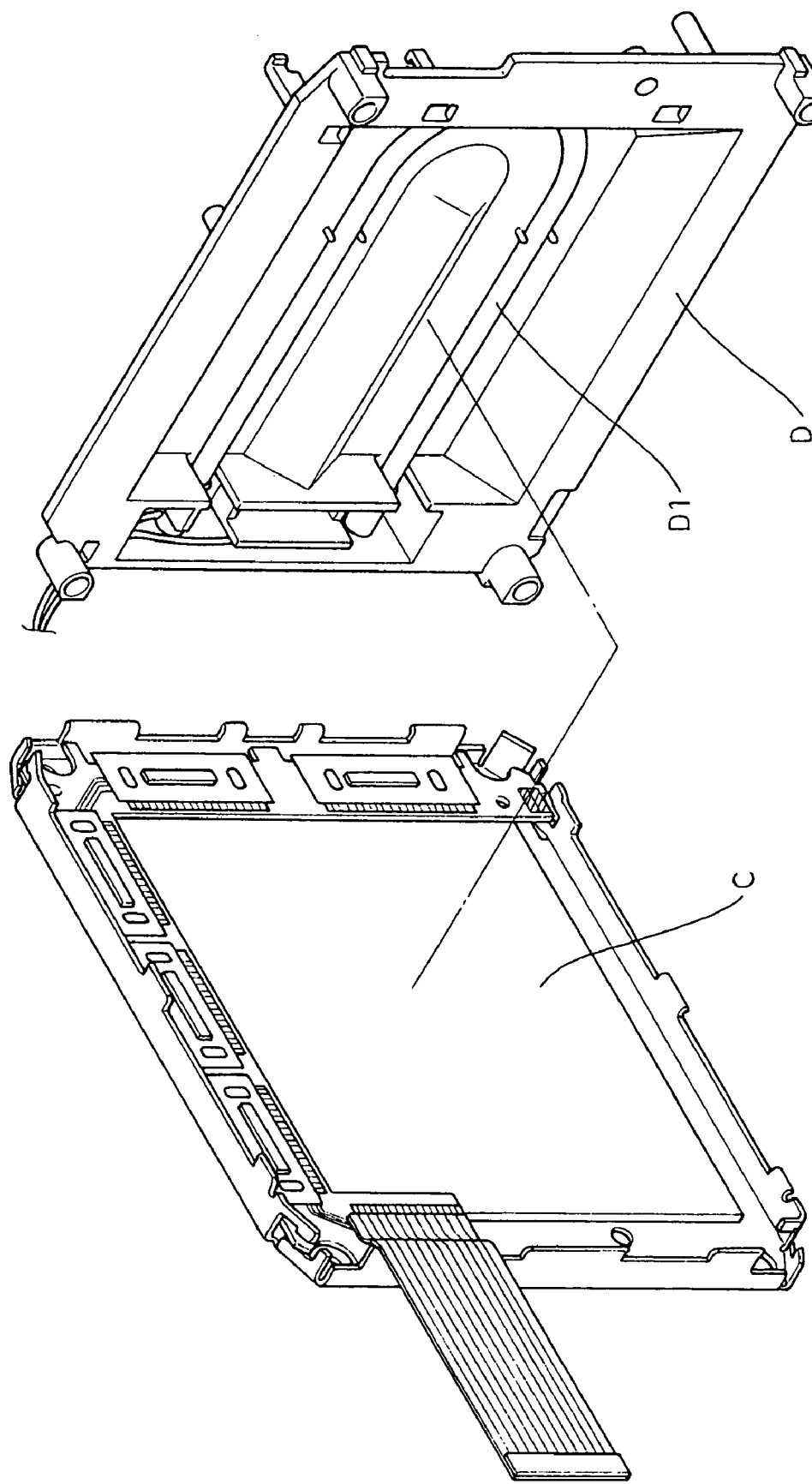
FIG. 2 is an exploded view of a TAB type panel module of the prior art.
Figure 3:
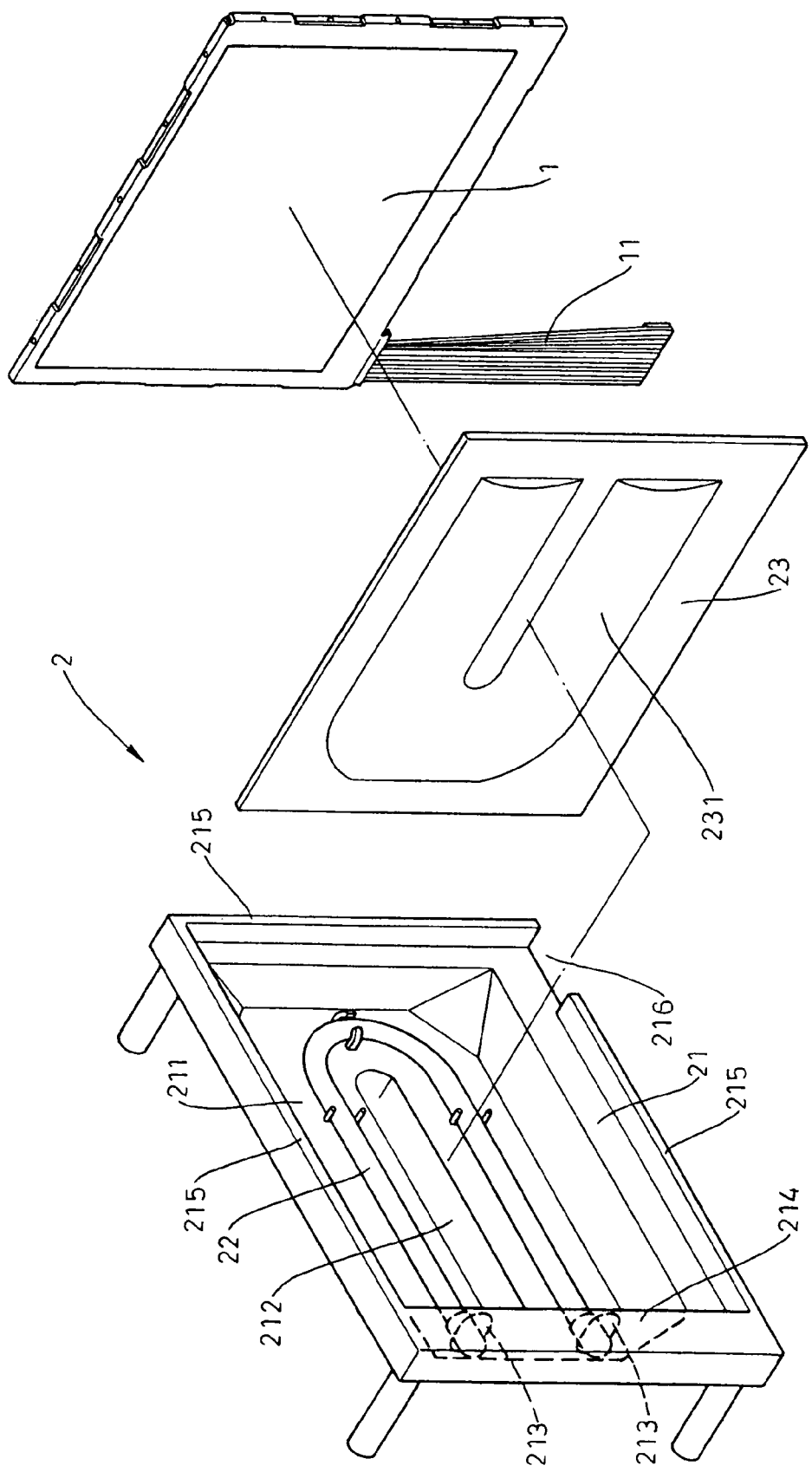
FIG. 3 is an exploded view of a preferred embodiment of the present invention.
Figure 4:
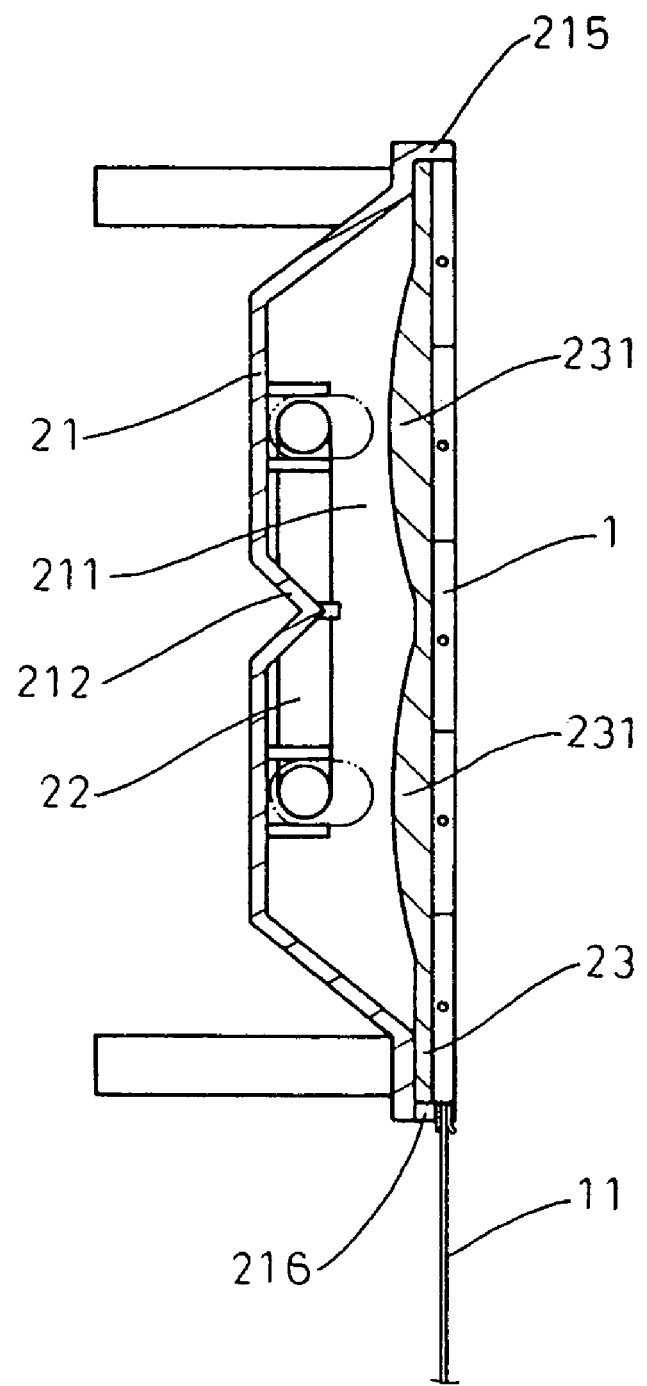
FIG. 4 is a sectional view of the preferred embodiment of the present invention.

Referring to FIGS. 3 and 4, a panel module of the present invention is comprised of an LCD panel (1) and a backlight module (2) to respectively provide image display and the source required for the image display in an entrance intercom unit. The LCD panel (1) relates to a COG type penal module and the backlight module (2) is direct light designed and disposed right beneath the LCD panel (1).

The backlight module (2) includes a reflector (21), a fluorescent lamp (22) and a light guide plate (23). Wherein, the reflector (21) relates to a rectangular plastic sheet approximately in the shape of W section. A lamp chamber (211) is provided in recess in the reflector (21), and a portioning strip (212) protrudes from the center of the lamp chamber (211) to be arranged on both sides of the portioning strip (212). The peripheral of the lamp chamber (211) is provided with upwardly expanded edge to improve the light utility. The edge on one side is provided with two through holes (212) in relation to where between the outlets of the lamp (22) for the outlets of the lamp (22) to pass through. A side lid (214) is provided protruding by the side of the edge. The side lid (214) relates to one having three sides closed to leave a hollow bottom, and is located at where slightly to the external of the top edge of the light chamber (211) and moving along the edge of the reflector (21). A wire trunk (not illustrated) is reserved inside the side lid (214) for the storage of a power cable of the lamp (2) leading out of the through holes (213). A lip (215) is each provided to the edges from other sides of the reflector (21) and is disposed externally to the top edge of the lamp chamber (211). A filling space in the size approximately to that of the light guide plate (23) and the LCD panel (1) is reserved to contain and allow the mutual combination of the light guide plate (23) and the LCD panel (1). A gap (216) for the access of a bus (11) is provided on the lip (215) at where in relation to the bus (11) of the LCD panel (1).

The light guide plate (23) made of transparent acrylic material has its peripheral bonded to the outer side of the lamp chamber (211), and the inner side of the side lid (214) and the inner side of the lip (215). An arc plane of diffusion (231) on the bottom of the reflector at where in relation to the area of the lamp (22) is provided to adjust astigmatism of the source of incidence and reduce the brightness directly over the lamp (22) to achieve more consistent light reflected from the plant of light emission on top of the arc plane of diffusion (231) to provide the plane of light source needed by the LCD panel to display image. The peripheral of the top of the light guide plate (23) is bonded to the back of the LCD panel (1) to complete an integral unit of a panel module.

In practice, the COG type LCD panel (1) adapted with the direct light backlight module (2) of TAB type panel module is used to display image for the user to identify the looks of the visitor. Therefore, in comparison with the sidelight backlight module of COG type panel module used for the entrance intercom unit of the prior art, the present invention gives more consistent lumens and higher brightness to upgrade the image quality. The backlight module (2) of the present invention is strictly comprised of a reflector (21), a lamp (22) and a light guide plate (23) to save approximately half of the production cost otherwise would have been spent on the BEF and a diffuser, thus to significantly reduce the production cost and selling price. With fewer components, the present invention permits easier process and assembly, and convenient the replacement of damaged part, such as the lamp (22). The heterogeneous design in the structure of the reflector (21) and the light guide plate (23) for the present invention gives easier assembly and lower production cost in comparison to the backlight module of TAB type panel module used in the prior art.

Furthermore, the present invention is approximately 5 mm thicker than the COG type panel module of the prior art and consumes slightly higher power due to longer lamp (22) is used in the present invention, but the present invention provides higher brightness. Since the present invention is used in the entrance intercom unit instead of any portable product, being thicker is not a problem The lamp (22) is turned on only during the communication between the user and the visitor, otherwise, the lamp (22) is always at off status and its power consumption is very limited. The structural design of combining the COG type LCD panel (1) and the TAB type backlight module (2) of the present invention is also applicable to the car-boarded TV set and the game of Pachinko, which shall be also included in the scope of the teaching of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An entrance intercom specific color panel module comprised of a COG type LCD panel adapted with a TAB type backlight module; the backlight module being direct light design to include a reflector, a fluorescent lamp and a light guide plate; a lamp chamber being formed in recess inside the reflector to accommodate the lamp, a side lid protruding by the side of the reflector, a lip being each provided to the edges of the remaining sides of the reflector to reserve a filling space inside the reflector of the same size as that of the light guide plate and the LCD panel to accommodate both is characterized by that the peripherals of the bottom and the top of the light guide plate being respectively to be bonded to the surface of the reflector and the back of the LCD panel.

* * * * *